United States Patent
Gray et al.

(10) Patent No.: US 10,931,617 B2
(45) Date of Patent: Feb. 23, 2021

(54) SHARING OF BUNDLED CONTENT

(71) Applicant: Microsoft Technology Licensing, LLC, Redmond, WA (US)

(72) Inventors: Linda Chen Gray, Kirkland, WA (US); Sherry Pei-chen Lin, Redmond, WA (US); Thomas Coolidge Stanton, Seattle, WA (US); Andrew James Peacock, Seattle, WA (US); Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 15/430,245

(22) Filed: Feb. 10, 2017

(65) Prior Publication Data

US 2018/0234374 A1    Aug. 16, 2018

(51) Int. Cl.
*H04L 12/58* (2006.01)
*G06Q 10/10* (2012.01)
(Continued)

(52) U.S. Cl.
CPC .......... *H04L 51/22* (2013.01); *G06Q 10/107* (2013.01); *H04L 51/14* (2013.01); *H04L 51/16* (2013.01); *H04L 63/101* (2013.01); *H04L 67/26* (2013.01)

(58) Field of Classification Search
CPC ......... H04L 51/16; H04L 51/22; H04L 51/14; H04L 63/101; G06Q 10/107
See application file for complete search history.

(56) References Cited

U.S. PATENT DOCUMENTS 6,424,362 B1   7/2002   Bornstein et al.
7,546,352 B1   6/2009   Bhattiprolu et al.
(Continued)

FOREIGN PATENT DOCUMENTS

EP    1777650 A1    4/2007
WO    2009109657 A2    9/2009
(Continued)

OTHER PUBLICATIONS

Agarwal, "A Bit about Bundles in Inbox", Published: https://web.archive.org/web/20161007091618/https://gmail.googleblog.com/2014/11/a-bit-about-bundles-in-inbox.html, Nov. 19, 2014, 5 Pages (Year: 2014).*

(Continued)

*Primary Examiner* — Jason D Recek
*Assistant Examiner* — Ranjan Pant

(57) ABSTRACT

Non-limiting examples describe sharing of bundled content through an application/service. A first input may be received, through a user interface of the email service. The first input is associated with a selection of a user interface element for sharing of a bundle of emails that comprises a grouping of at least two separate email threads. A second input is received indicating one or more other users for sharing the bundle of emails. The bundle of emails is shared with the one or more other users. Sharing of the bundle of emails creates a sharing permission that enables multi-directional sharing between the user and the one or more other users for current content of the shared bundle of emails and future content added to the shared bundle of emails. The shared bundle of emails is displayed inline with other emails of an email mailbox of the user through the user interface.

20 Claims, 9 Drawing Sheets

(51) Int. Cl.
  *H04L 29/06* (2006.01)
  *H04L 29/08* (2006.01)
  *G06F 15/16* (2006.01)

(56) References Cited

U.S. PATENT DOCUMENTS

| | | | |
|---|---|---|---|
| 7,693,940 B2* | 4/2010 | Carmel | G06F 17/279 709/203 |
| 7,707,255 B2 | 4/2010 | Satterfield et al. | |
| 7,831,676 B1* | 11/2010 | Nagar | G06Q 10/107 709/203 |
| 7,885,948 B2 | 2/2011 | Johnson et al. | |
| 7,904,525 B2 | 3/2011 | Eggers et al. | |
| 8,156,123 B2 | 4/2012 | Tribble et al. | |
| 8,209,617 B2 | 6/2012 | Vanderwende et al. | |
| 8,224,914 B2 | 7/2012 | Thomas et al. | |
| 8,463,827 B2 | 6/2013 | Ramarao et al. | |
| 8,548,973 B1 | 10/2013 | Kritt et al. | |
| 8,745,045 B2 | 6/2014 | Bawri et al. | |
| 8,996,530 B2 | 3/2015 | LuVogt et al. | |
| 9,076,147 B2* | 7/2015 | Khoo | G06Q 10/107 |
| 2005/0091184 A1 | 4/2005 | Seshadri et al. | |
| 2005/0182773 A1* | 8/2005 | Feinsmith | G06Q 10/10 |
| 2006/0206495 A1 | 9/2006 | Van gageldonk et al. | |
| 2007/0226204 A1 | 9/2007 | Feldman | |
| 2007/0239755 A1 | 10/2007 | Mahoney | |
| 2007/0266095 A1* | 11/2007 | Billsus | G06Q 10/10 709/204 |
| 2008/0086703 A1 | 4/2008 | Flynt et al. | |
| 2008/0281927 A1 | 11/2008 | Vanderwende et al. | |
| 2009/0187548 A1 | 7/2009 | Ji et al. | |
| 2010/0036922 A1 | 2/2010 | Stafford et al. | |
| 2010/0169320 A1* | 7/2010 | Patnam | H04L 51/34 707/737 |
| 2010/0223261 A1 | 9/2010 | Sarkar | |
| 2010/0257230 A1 | 10/2010 | Kroeger et al. | |
| 2010/0332428 A1* | 12/2010 | McHenry | G06Q 10/10 706/12 |
| 2011/0004573 A1 | 1/2011 | Chitiveli et al. | |
| 2011/0126126 A1 | 5/2011 | Blair | |
| 2011/0307482 A1 | 12/2011 | Radlinski et al. | |
| 2012/0005284 A1 | 1/2012 | Tse | |
| 2012/0158728 A1* | 6/2012 | Kumar | G06F 16/954 707/737 |
| 2012/0173533 A1 | 7/2012 | Ramarao et al. | |
| 2012/0226681 A1 | 9/2012 | Paparizos et al. | |
| 2013/0024788 A1 | 1/2013 | Olsen et al. | |
| 2013/0055105 A1* | 2/2013 | Spierer | G06Q 10/107 715/752 |
| 2013/0166548 A1 | 6/2013 | Puzicha et al. | |
| 2013/0198296 A1* | 8/2013 | Roy | G06Q 10/107 709/206 |
| 2013/0241499 A1 | 9/2013 | Johnson et al. | |
| 2014/0006409 A1 | 1/2014 | Prosnitz et al. | |
| 2014/0040770 A1 | 2/2014 | Khoo | |
| 2014/0046945 A1 | 2/2014 | Deolalikar et al. | |
| 2014/0108066 A1* | 4/2014 | Lam | G06Q 10/10 705/5 |
| 2014/0143254 A1 | 5/2014 | Datta et al. | |
| 2014/0172821 A1 | 6/2014 | Hu et al. | |
| 2014/0173457 A1 | 6/2014 | Wang et al. | |
| 2014/0289258 A1* | 9/2014 | Joshi | G06Q 10/107 707/741 |
| 2014/0310281 A1 | 10/2014 | Somekh et al. | |
| 2014/0372446 A1* | 12/2014 | Bell | G06Q 10/107 707/740 |
| 2015/0127754 A1 | 5/2015 | Clark et al. | |
| 2015/0186478 A1 | 7/2015 | Yan et al. | |
| 2015/0186494 A1* | 7/2015 | Gilad | H04L 51/22 707/740 |
| 2015/0234893 A1 | 8/2015 | Kaasten et al. | |
| 2015/0256499 A1* | 9/2015 | Kumar | H04L 67/22 709/206 |
| 2015/0326521 A1 | 11/2015 | Osipkov et al. | |
| 2015/0341300 A1 | 11/2015 | Swain et al. | |
| 2016/0080303 A1 | 3/2016 | Deolalikar et al. | |
| 2016/0173433 A1* | 6/2016 | Bastide | G06F 16/122 709/206 |
| 2016/0182311 A1 | 6/2016 | Borna | |
| 2016/0241499 A1 | 8/2016 | Hailpern et al. | |
| 2016/0301705 A1 | 10/2016 | Higbee et al. | |
| 2016/0314182 A1* | 10/2016 | Zhang | H04L 43/04 |
| 2016/0314184 A1* | 10/2016 | Bendersky | G06F 16/35 |
| 2016/0323223 A1 | 11/2016 | Davis et al. | |
| 2017/0004199 A1 | 1/2017 | Hausler et al. | |
| 2017/0228114 A1 | 8/2017 | Brett et al. | |
| 2018/0006973 A1 | 1/2018 | Hays et al. | |
| 2018/0232441 A1 | 8/2018 | Lin et al. | |
| 2018/0234375 A1 | 8/2018 | Gray et al. | |
| 2018/0234376 A1 | 8/2018 | Gray et al. | |
| 2018/0234377 A1 | 8/2018 | Gray et al. | |
| 2020/0028814 A1 | 1/2020 | Gray et al. | |

FOREIGN PATENT DOCUMENTS

| | | |
|---|---|---|
| WO | 2013113093 A1 | 8/2013 |
| WO | 2016144992 A1 | 9/2016 |
| WO | 2016164844 A1 | 10/2016 |

OTHER PUBLICATIONS

"Group or ungroup messages in your Inbox", Retrieved from https://support.office.com/en-us/article/Group-{ }r-ungroup-messages-inour-Inbox-c6d17df3-8488-42b2-a773-278686205478, Dec. 21, 2016, 2 Pages.

"Using Tags and Folders to Organize Your Mailbox", Retrieved From: http://docplayer.net/8609804-Zimbra-web-client-user-guide.html, Dec. 27, 2016, 22 Pages.

Aaron, "Clean up your inbox with bundles", Retrieved From: https://support.google.com/inbox/answer/6050237?hl=en&ref_topic=6067574, Dec. 20, 2016, 2 Pages.

Aaron, "Label emails in Inbox", Retrieved From: https://support.google.com/inbox/answer/6067566?hl=en, Dec. 20, 2016, 2 Pages.

Arenas, et al., "SemFacet: Semantic Faceted Search over Yago", in Proceedings of the 23rd International Conference on World Wide Web, Apr. 7, 2014, 4 Pages.

Ayodele, et al., "Email Grouping and Summarization: An Unsupervised Learning Technique", In Proceedings of World Congress on Computer Science and Information Engineering vol. 5, Mar. 31, 2009, pp. 575-579.

Carenini, et al., "Scalable Discovery of Hidden Emails from Large Folders", In Proceedings of the Eleventh ACM SIGKDD International Conference on Knowledge Discovery in Data Mining, Aug. 21, 2005, 4 Pages.

Casey, Keith, "Making Your Inbox Intelligent with Context.IO and Twilio", Retrieved from https://www.twilio.com/blog/2013/10/contexio-and-twilio.html, Oct. 10, 2013, 6 Pages.

Giacoletto, et al., "Automatic Expansion of Manual Email Classifications Based on Text Analysis", In Proceedings of International Conference on Ontologies, Databases and Applications of Semantics, Nov. 3, 2003, 18 Pages.

Hachman, Mark, "Google in box is lousy; try it for yourself and see if you agree.", Retrieved From: http://www.greenbot.com/article/2877615/google-inbox-is-lousy-try-it-for-yourself-and-see-if-you-agree.html, Jan. 29, 2015, 5 Pages.

Muresan, et al., "Combining Linguistic and Machine Learning Techniques for Email Summarization", In Proceedings of Workshop on Computational Natural Language Learning, vol. 7, Jul. 6, 2001, 8 Pages.

"International Search Report and Written Opinion Issued in PCT Application No. PCT/US2018/016781", dated Apr. 18, 2018, 13 Pages.

"International Search Report and Written Opinion Issued in PCT Application No. PCT/US2018/016782", dated May 15, 2018, 13 Pages.

"International Search Report & Written Opinion for PCT Application No. PCT/US2018/016783", dated Mar. 21, 2018, 11 Pages.

(56) References Cited

OTHER PUBLICATIONS

"International Search Report and Written Opinion Issued in PCT Application No. PCT/US2018/016784", dated Apr. 30, 2018, 12 Pages.
Phadke, Gautam, Swapna, "Email Classification Using a Self-Learning Technique Based on User Preferences", In Partial Fulfillment of the Requirements for the Degree of Master of Science, Master Thesis of North Dakota State University, Oct. 2015, 55 Pages.
Rennie, J., "ifile: An Application of Machine Learning to E-Mail Filtering", In Proceedings of Sixth ACM SIGKDD International Conference on Knowledge Discovery and Data Mining Workshop on Text Mining, Aug. 20, 2000, 6 Pages.
Russell, Eleanor, "Guidelines on Developing a Policy for Managing Email.", In National Archives, Jan. 2004, 8 Pages.
Smith, Lauren, "The Ultimate Guide to Preview Text Support", Retrieved from https://litmus.com/blog/the-ultimate-guide-to-preview-text-support, Apr. 29, 2015, 19 Pages.
Sorower, et al., "Improving Automated Email Tagging with Implicit Feedback", In Proceedings of 28th ACM Symposium on User Interface Software and Technology, Nov. 5, 2015, 11 Pages.
Standss, "Organizing Emails: Folders versus Tags", Retrieved From: http://www.standss.com/blog/index.php/organizing-emails-folders-tags/, Jan. 5, 2016, 7 Pages.
Tam, et al., "Automatic Foldering of Email Messages: a Combination Approach", In Proceedings of 34th European Conference on Advances in Information Retrieval, Apr. 1, 2012, 1 Page.
Thomas, et al., "Using a Sentence Compression Pipeline for the Summarization of Email Threads in an Archive", In Journal of Computer Sciences in Colleges, vol. 31, Issue 2, Dec. 1, 2015, 7 Pages.
Weverka, Peter, "Archiving Outlook Folders", Retrieved From: https://www.dummies.com/software/microsoft-office/outlook/archiving-outlook-folders/, Dec. 27, 2016, 3 Pages.
"Team Chat and Collaboration Right From Gmail", Retrieved From: https://web.archive.org/web/20161101015942/gmaillabel.cloudhq.net/, Nov. 1, 2016, 5 Pages.
"International Search Report and Written Opinion Issued in PCT Application No. PCT/US2018/016785", dated Mar. 27, 2018, 10 Pages.
"Non Final Office Action Issued in U.S. Appl. No. 15/430,270", dated Oct. 24, 2018, 27 Pages.
"Non Final Office Action Issued in U.S. Appl. No. 15/430,290", dated Aug. 7, 2018, 8 Pages.
"Non Final Office Action Issued in U.S. Appl. No. 15/430,316", dated Oct. 17, 2018, 21 Pages.
Aaron, "Organize travel plans into Trip bundles", https://support.google.com/inbox/answer/6228360?hl=en, Retrieved on: Dec. 20, 2016, 3 pages.
Greenstone, Scott, "Inbox by Gmail—Multiple Bundles", http://www.scottgreenstone.com/2014/12/inbox-by-gmail-multiple-bundles.html, Published on: Mar. 17, 2015, 10 pages.
Nguyen, Chuong, "Google Inbox's shareable Trip Bundles make it easier to coordinate travel", http://www.in.techradar.com/news/software/applications/Google-Inboxs-shareable-Trip-Bundles-make-it-easier-to-coordinate-travel/articleshow/50178973.cms, Published on: Dec. 15, 2015, 10 pages.
"How to Create Your Own Bundle in Google Inbox", https://web.archive.org/web/20141107144700/http:/www.wikihow.com/Create-Your-Own-Bundle-in-Google-Inbox, Published on: Nov. 7, 2014, 2 pages.
"How do I share trip details with others?", https://www.airbnb.co.in/help/article/1175/how-do-i-share-trip-details-with-others, Retrieved on: Dec. 20, 2016, 1 pages.
Smith, Lauren, "A First Look at Inbox by Gmail: What Email Marketers Need to Know", https://litmus.com/blog/a-first-look-at-inbox-by-gmail-what-email-marketers-need-to-know, Published on: Oct. 24, 2014, 11 pages.
Munn, David, "Policy for managing email in the Greater London Authority", http://www.london.gov.uk/moderngov/Data/Business%20Management%20and%20Administration%20Committee/20041201/Agenda/16%20Appendix%201%20RTF.rtf, Retrieved on: Dec. 20, 2016, 1-14 pages.
"Final Office Action Issued in U.S. Appl. No. 15/430,290", dated Jan. 31, 2019, 12 Pages.
"Non Final Office Action Issued in U.S. Appl. No. 15/430,327", dated Mar. 8, 2019, 15 Pages.
"Non Final Office Action Issued in U.S. Appl. No. 15/430,290", dated Jul. 31, 2019, 11 Pages.
"Notice of Allowance Issued in U.S. Appl. No. 15/430,327", dated Jul. 10, 2019, 15 Pages.
"How can I Prevent Email Threads I have Assigned to a List from Appearing in my Inbox again", Retrieved From: https://sortd.freshdesk.com/support/solutions/articles/6000046083-how-can-i-prevent-email-threads-i-have-assigned-to-a-list-from-appearing-in-my-inbox-again-, Aug. 20, 2015, 1 Page.
"How to Make Your Own Labels in Google Inbox", Retrieved From: https://web.archive.org/web/20161222143019/http://www.wikihow.com:80/Make-Your-Own-Labels-in-Google-Inbox, Dec. 22, 2016, 6 Pages.
"How to Save Email Into Evernote", Retrieved From: https://web.archive.org/web/20161021055528/https://help.evernote.com/hc/en-us/articles/209005347-How-to-save-email-into-Evernote, Retrieved on: Oct. 21, 2016, 6 Pages.
"How to Use Bundles in Google Inbox", Retrieved From: https://web.archive.org/web/20170125202648/https://www.wikihow.com/Use-Bundles-in-Google-Inbox, Retrieved on: Jan. 25, 2017, 5 Pages.
"How to Use Google Inbox", Retrieved From: https://web.archive.org/web/20160810050026/https://www.wikihow.com/Use-Google-Inbox, Retrieved on: Aug. 10, 2016, 7 Pages.
"Inbox by Gmail 101", Retrieved From: https://web.archive.org/web/20150705015438/http://gmail-miscellany.blogspot.com:80/2014/10/inbox-by-gmail-101.html, Oct. 22, 2014, 14 Pages.
"Inbox by Gmail Help", Retrieved From: https://web.archive.org/web/20170208235410/https://support.google.com/inbox/?hl=en, Retrieved on: Feb. 8, 2017, 115 Pages.
"Threading Messages Together", Retrieved From: https://web.archive.org/web/20170128161844/https://api.slack.com/docs/message-threading, Retrieved on: Jan. 28, 2017, 13 Pages.
"View & Organize your Inbox", Retrieved From: https://web.archive.org/web/20160513074613/https://support.google.com/mail/topic/3394656?hl=en&ref_topic=3394150, Retrieved on: May 13, 2016, 43 Pages.
"Final Office Action Issued in U.S. Appl. No. 15/430,270", dated May 20, 2019, 29 Pages.
"Final Office Action Issued in U.S. Appl. No. 15/430,316", dated May 16, 2019, 38 Pages.
Aberdeen, et al., "The Learning Behind Gmail Priority Inbox", Retrieved From: https://web.archive.org/web/20150218101156/http://static.googleusercontent.com/media/research.google.com/en//pubs/archive/36955.pdf, Retrieved on: Feb. 18, 2015, 4 Pages.
Agarwal, Shalini , "A Bit about Bundles in in box", Retrieved From: https://web.archive.org/web/20161007091618/https://gmail.googleblog.com/2014/11/a-bit-about-bundles-in-inbox.html, Nov. 19, 2014, 5 Pages.
Biersdorfer, J D., "Use Labels to Sort Messages in Gmail", Retrieved From: https://web.archive.org/web/20161230040642/http://www.nytimes.com/2016/12/21/technology/personaltech/use-labels-to-sort-messages-in-gmail.html, Dec. 21, 2016, 2 Pages.
Einstein, Michael, "Email Processing and Triage Basics", Retrieved From: https://web.archive.org/web/20190426210912/https://michael-einstein.squarespace.com/blog/e-mail-triage-basics, May 29, 2014, 4 Pages.
Einstein, Michael, "Use Invisible Hashtags to Track Emails", Retrieved From: https://www.emailoverloadsolutions.com/blog/invisible-email-hashtags, Dec. 8, 2016, 5 Pages.
Einstein, Michael, "Using Outlook Categories: A Primer", Retrieved From: https://web.archive.org/web/20160503124600/https://www.emailoverloadsolutions.com/blog/using-e-mail-categories-a-primer, Jul. 22, 2014, 8 Pages.
Frost, Aja, "Tagging Tips: How to Organize Files and Other Information with Tags", Retrieved From: https://zapier.com/blog/how-to-use-tags-and-labels/#email, Aug. 11, 2016, 30 Pages.

(56) References Cited

OTHER PUBLICATIONS

Hiscott, Rebecca, "The Beginner's Guide to the Hashtag", Retrieved From: https://web.archive.org/web/20160206044144/https://mashable.com/2013/10/08/what-is-hashtag/, Oct. 8, 2013, 9 Pages.

Irish, Emily, "Forget Inbox Zero: Manage Your Inbox Better with These Smart Email Workflows", Retrieved From: https://zapier.com/blog/email-inbox-workflow/, Oct. 25, 2016, 23 Pages.

Kricfalusi, Elizabeth, "Stop the Email Threading Madness", Retrieved From: https://web.archive.org/web/20170606154125/https://techforluddites.com/email-turn-off-conversation-view-gmail-yahoo-outlook-ios/, May 16, 2017, 11 Pages.

Kricfalusi, Elizabeth, "Turn Off Email Grouping in Outlook", Retrieved From: https://web.archive.org/web/20160419205247/https://techforluddites.com/turn-off-email-grouping-in-outlook/, Jun. 30, 2015, 6 Pages.

Patkar, Mihir, "3 Secret Ways to Use Hashtags You've Never Tried Before", Retrieved From: https://web.archive.org/web/20160213160318/https://www.makeuseof.com/tag/3-secret-ways-to-use-hashtags-that-make-digital-searches-easier-fasted, Aug. 16, 2013, 6 Pages.

Pinola, Melanie, "Add Invisible Hashtags to Your Emails for Better Search and Organization", Retrieved From: https://zapier.com/blog/email-hashtags-tip/, Nov. 28, 2016, 4 Pages.

Pinola, Melanie, "How I Finally Organized My Messy in box with Sortd", Retrieved From: https://web.archive.org/web/20170107202606/https://lifehacker.com/how-i-finally-organized-my-messy-inbox-with-sortd-1754956174, Jan. 26, 2016, 8 Pages.

"Non Final Office Action Issued in U.S. Appl. No. 15/430,270", dated Jan. 21, 2020, 27 Pages.

"Notice of Allowance Issued in U.S. Appl. No. 15/430,327", dated Oct. 24, 2019, 7 pages.

"Final Office Action Issued in U.S. Appl. No. 15/430,290", dated Mar. 17, 2020, 13 Pages.

"Final Office Action Issued in U.S. Appl. No. 15/430,270", dated Jul. 10, 2020, 29 Pages.

"Notice of Allowance Issued in U.S. Appl. No. 16/585,359", dated Sep. 9, 2020, 18 Pages.

\* cited by examiner

100

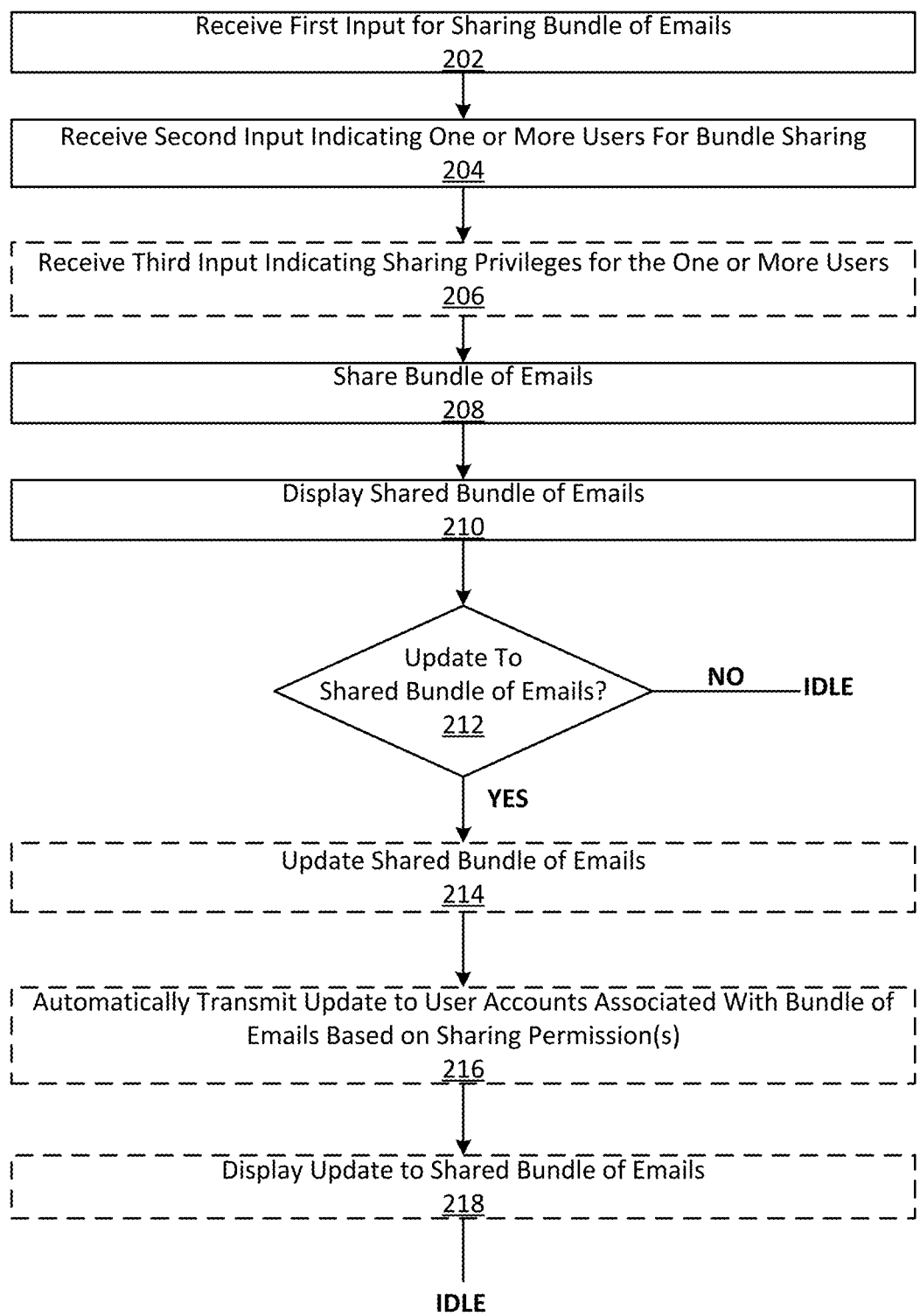

300

SHARING OF BUNDLED CONTENT

BACKGROUND

Currently, the only mechanisms available to a user to group together like content is through folder creation or through the creation of a label. In one instance, traditional email clients allow a user to create a folder and move content into the folder. However, this folder is outside the inbox, thus demoting the importance of said messages. Further, the folder structure is everlasting and remains a fixture in a navigational pane of an email client, which can clog up a mailbox of a user. Folder structures can also complicate a user interface of an email client, especially when users access an email client through a mobile device, which has limited display space. Furthermore, limitations with folder structures exist when there are other users that content is to be shared with. With folder structures, the other users are required to manually access a folder and do not receive automatic content updates. In alternative instances a label can be created for management of content. However, labels work like folders and have the same issues as described above. Labels are not ephemeral, have sharing limitations and have the potential to clog up the user interface and mailbox history of an email client.

In traditional email clients, the only way for a set of users to share email content is through manually forwarding each mail or signing up all users for a distribution list and sending all emails to the distribution list. However, such actions are limited in that future content that is received is not automatically provided to shared users, where users would need to constantly forwarding new content to other users whom they want to share the content with.

As such, examples of the present application are directed to the general technical environment related to improving operation of an email service, where processing efficiency and usability are improved, among technical benefits.

SUMMARY

Non-limiting examples describe sharing of bundled content through an application/service. A first input may be received, through a user interface of the email service. The first input may be associated with a selection of a user interface element for sharing of a bundle of emails that comprises a grouping of at least two separate email threads. A second input may be received indicating one or more other users for sharing the bundle of emails. The bundle of emails may be shared with the one or more other users. Sharing of the bundle of emails creates a sharing permission that enables multi-directional sharing between the user and the one or more other users for current content of the shared bundle of emails and future content added to the shared bundle of emails. The shared bundle of emails may be displayed inline with other emails of an email mailbox of the user through the user interface of the email service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 is an exemplary method related to sharing of bundled content with which aspects of the present disclosure may be practiced.

DETAILED DESCRIPTION

Non-limiting examples of the present disclosure describe sharing of bundled content, where a user interface of an application/service is configured to enable users to share bundled content with other users. As an example, an exemplary bundle of content may be a bundle of emails associated with an email service. Exemplary bundles of content provide an alternative solution to folder/label solutions, where bundles of content are ephemeral in nature and can be presented inline with other content (e.g. email content) of an application/service (e.g. email service). While examples herein relate to sharing of bundled content from an application/service, it is to be understood that examples described herein may extend to any aspect for management of bundled content including but not limited to: user-creation of a bundle of content, automatic generation (e.g. auto-bundling) of content on behalf of a user, enhanced search and filtering functionality for content (including bundled content) and generation of rich content previews for bundles of content. Other aspects related to management of bundled content may be provided in related co-pending applications.

Figure 1:
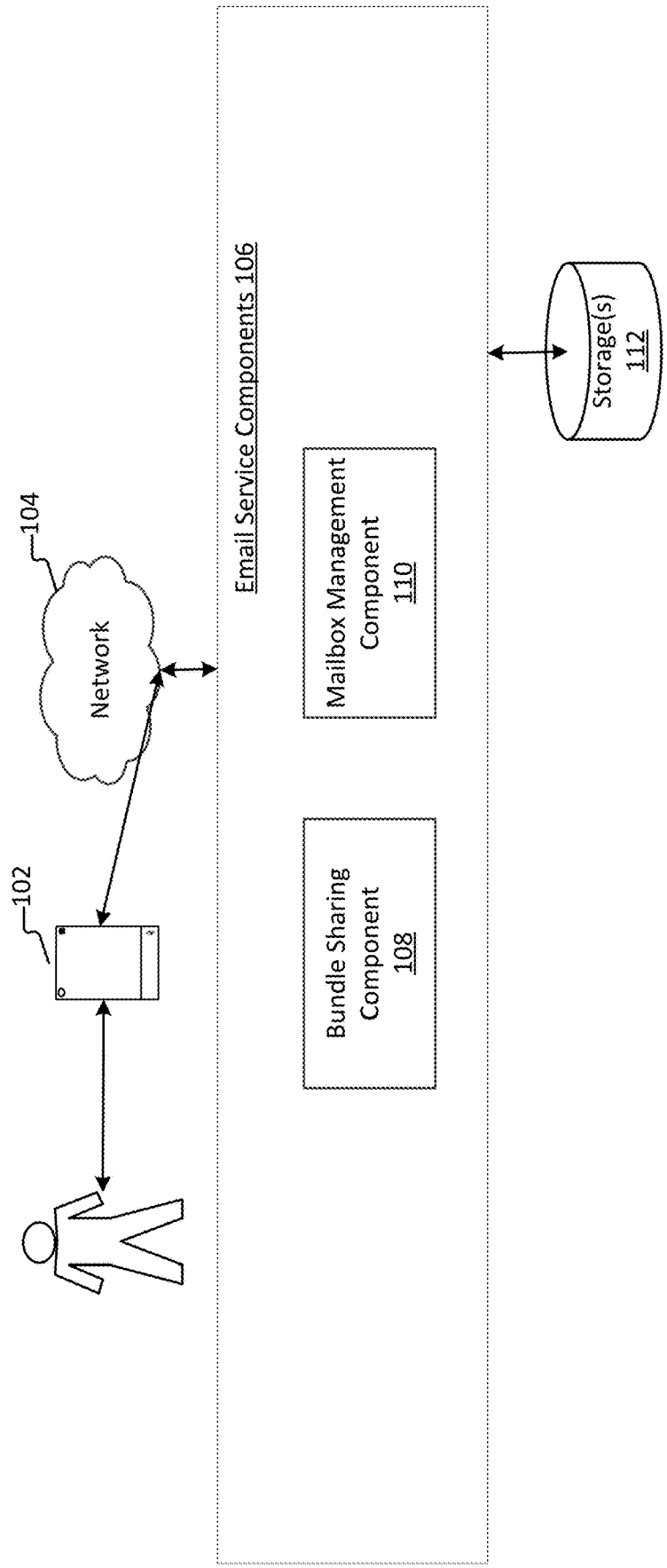
FIG. 1 illustrates an exemplary system implementable on one or more computing devices on which aspects of the present disclosure may be practiced.

FIG. 1 illustrates an exemplary system 100 implementable on one or more computing devices on which aspects of the present disclosure may be practiced. System 100 may be an exemplary system for execution of an email service with which aspects of the present disclosure may be practiced. As an example, one or more components for managing sharing of a bundle of content may interface with one or more other components of an email service. Components of system 100 may be hardware components or software implemented on and/or executed by hardware components. In examples, system 100 may include any of hardware components (e.g., ASIC, other devices used to execute/run an OS, and software components (e.g., applications, application programming interfaces, modules, virtual machines, runtime libraries) running on hardware. In one example, an exemplary system 100 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 4-6. One or more components of system 100 may be configured to execute any of the processing operations described in at least method 200 described in the description of FIG. 2. In other examples, the components of systems disclosed herein may be spread across multiple devices. Exemplary system 100 comprises email service components 106 that further comprise: a bundle sharing component 108 and a mailbox management component 110.

One or more data stores/storages or other memory may be associated with system 100. For example, a component of system 100 may have one or more data storage(s) 112 (described below) associated therewith. Data associated with a component of system 100 may be stored thereon as well as processing operations/instructions executed by a component of system 100. Furthermore, it is presented that application components of system 100 may interface with other application services. Application services may be provided as platform resources referenced in the foregoing. Application services may be any resource that may extend functionality of one or more components of system 100. Application services may include but are not limited to: personal intelligent assistant services, web search services, e-mail applications, word processing applications, spreadsheet applications, presentation applications, notes applications, calendaring applications, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 100.

System 100 may comprise one or more storage(s) 112 that may store data associated with operation of one or more components of system 100. In examples, storage(s) 112 may interface with other components of system 100. Data associated with any component of system 100 may be stored in storage(s) 112, where components may be connected to storage(s) 112 over a distributed network including cloud computing platforms and infrastructure services. Exemplary storage(s) 112 may be any of a first-party source, a second-party source, and a third-party source. Storage(s) 112 are any physical or virtual memory space. Storage(s) 112 may store any data for processing operations performed by components of system 100, retained data from processing operations, stored programs, code or application programming interfaces (APIs), training data, links to resources internal and external to system 100 and knowledge data among other examples. Furthermore, in examples, components of system 100 may utilize knowledge data in processing by components of system 100. Knowledge may be used by one or more components of system 100 to improve processing of any of the email service components 106 where knowledge data can be obtained from resources internal or external to system 100. In examples, knowledge data may be maintained in storage(s) 112 or retrieved from one or more resources external to system 100 by knowledge fetch operation.

In FIG. 1, processing device 102 may be any device comprising at least one processor and at least one memory/storage. Examples of processing device 102 may include but are not limited to: processing devices such as desktop computers, servers, phones, tablets, phablets, slates, laptops, watches, and any other collection of electrical components such as devices having one or more processors or circuits. In one example processing device 102 may be a device of a user that is executing applications/services such as an exemplary email service (e.g. email client). An example of an email service is Outlook®. In examples, processing device 102 may communicate with the email service components 106 via a network 104. In one aspect, network 104 is a distributed computing network, such as the Internet. Email service components 106 may also communicate with application services via the network 104. Processing device 102 may be a device as described in the description of FIGS. 4-6. In some examples, processing device 102 may comprise multiple connected devices. Processing device 102 is an example of a user computing device.

The processing device 102 may execute processing operations that include an ability to access an application/service through a user account. In one example, processing device 102 may connect an authenticated user to an exemplary application/service that stores user data for one or more users of the application/service. For example, a user, utilizing processing device 102, may access an email service, where the email service may authenticate a user account of the user. The email service may access a mailbox management component 110 (of the email service components 106) to provide, to the processing device 102, a representation of a mailbox (of the email service) that is associated with the user account of the user.

An exemplary storage application/service may provide a user of processing device 102 with access to data stored in an exemplary data center. In one example, processing device 102 may be connected with storage(s) 112 via a distributed network, which may provide users with access to user data. One or more tenant resources (e.g. Tenant Resource A, Tenant Resource B, Tenant Resource C, etc.) may be associated with processing device 102. A tenant resource may be a user account associated with a processing device and/or distributed network service. Data associated with a tenant resource may be stored on storage(s) 112, where a tenant account can be utilized to access stored data by processing device 102 and/or other processing devices. Email service components 106 are components configured to execute processing operations to enable creation, sharing and management of a bundle of emails within an exemplary email service that is executing on client computing device 102. While examples described herein reference bundling of emails in an email service, it is to be understood that examples described herein are not limited to bundling of emails (of an email service) and may extend to any type of data bundling that can be used to replace folders/labels for bundling data for a service. The email service components 106 are executed by one or more computing devices. An exemplary computing device may comprise one or more processors and memory, among other components. Examples of computing devices are provided in the description of at least FIGS. 4-6. As referenced above, the email service components 106 comprise: a bundle sharing component 108 and a mailbox management component 110.

The bundle sharing component 108 is configured to manage sharing of created bundles. Created bundles may comprise any of bundles created by a user and bundles automatically created by an email service on behalf of a user. Traditionally, email services are used for personal organization and do not allow for sharing of content or collaboration. In previous solutions, the only way for a set of users to share email content is through manually forwarding each mail or signing up all users for a distribution list and sending all emails to the distribution list, which is very heavy and not an optimal solution. Further, such solutions are further limited in that they only allow collaborated users to see past emails that have been forward by a user.

The bundle sharing component 108 is configured to create, for a bundle of content, a sharing permission that enables multi-directional sharing between the user and the one or more other users for current content of the shared bundle of emails and future content added to the shared bundle of emails. This enables a user to share a bundles worth of content with another user, thus allowing them to see not just the past emails that fell within the bundle, but all future items that get added to the bundle at a later point in time. For instance, if user A creates a bundle, shares with user B, then user B can add and remove content from the bundle which is then shared with user A. When user B adds an item to a shared bundle for the first time, they are alerted that the changes are shared to all participants. If user A adds email X to the shared bundle and user B removes email X from the bundle, the item is removed from the bundle and user C is not able to see email X. However, since the email originated in the inbox of user A, it will remain in their inbox.

Custom bundles (e.g. bundles of emails) are a lightweight mechanism for managing associations between content (e.g. emails where a bundle of emails may be created). A bundle can be defined as an automatic of manually set grouping of like items. As an example, a bundle may be created to group two or more email messages of an email service, creating a bundle of emails. An exemplary bundle of emails may comprise a grouping of at least two separate email threads. The bundle of emails may further comprise an exemplary tag, providing an association to an entity type tagging structure. An exemplary entity type tagging structure can be utilized to classify emails of an email service including bundled emails. Data associated with the entity type tagging structure (including an exemplary tag) can be used to assist with searching and filtering of email data including bundles of emails.

An exemplary tag is further used to associate email messages and content of the bundle (e.g. bundle of emails). The tag associates an email message (and/or other content) with one or more additional email (and/or other content). In one example, an exemplary tag is a hashtag. However, tags are not limited to such a form. Created tags become entity values that can be used to efficiently associate emails of a bundle. Tags further become entity data that can be used to prioritize searching and retrieval of created bundles. In some instances, tags may remain associated with a bundle even when a message is separated from a bundle. This may assist users with being able to quickly relocate an email during a subsequent search. In alternative examples, an email that was previously associated with a bundle and later removed may not retain an association to an exemplary tag.

A bundle of emails is tagged with the bundle name/tag ID as part of an entity type tagging infrastructure. In one example, an entity type tagging infrastructure may be used for the assignment and management of tags associated with bundles of emails. That is, an entity type tagging structure may be generated for specific emails included in a bundle of emails. The entity type tagging structure may comprise a plurality of fields that are configured by developers, where data of the entity type tagging infrastructure can be utilized for management of content associated with a bundle including searching and filtering of bundles of content and sharing of bundled content. Attributes and fields associated with an exemplary entity type tagging infrastructure may vary based on the type of email content. In further examples, an entity type tagging infrastructure may be used for classification of any type of emails including emails not included in a bundle of emails as data from an entity type tagging infrastructure may be utilized to increase accuracy in classifying emails as a specific type or category. An exemplary categorization for a bundle of emails may be useful for back-end processing performed by the email service including: analysis of the bundle of emails (including content of the bundle of emails), generation of a representation of an exemplary mailbox, generation of recommendations/suggestions for a user, telemetry analysis for the email service and/or other associated applications/services, and other aspects of management of bundled content (e.g. sharing, searching/filtering, generation of rich content previews, etc.) among other examples. Examples of data fields that may be included in an exemplary entity type tagging infrastructure comprise but are not limited to: context fields pertaining to specific data of an email, tag/hashtag fields, email type fields, category fields, entity data fields, data source fields, date/timestamp information, hyperlink data fields, domain information fields, formatting/arrangement fields, confidence scores pertaining to classification and specific attributes of an email, data pertaining to specific email content and user triage action history with respect to specific messages (e.g. emails) and/or a category/type for the specific message, among other examples.

An exemplary bundle is contextually relevant and presented inline with other emails of a user mailbox. An email service is configured to create bundles of content on behalf of a user based on meaningful categories for the user/groups of users. This is a better solution than folders, labels or setting of email rules because a created bundle is ephemeral in nature. Bookmarked links such as folders/labels are not required to be created within a navigational pane of a user interface of an email service. Further, bundled content is automatically updated and intelligently managed by an email service, where bundled content can be automatically updated based on changes to message content associated with a user mailbox. If the topic item becomes irrelevant, a bundle would drop off (e.g. de-prioritize), but the bundle structure would still remain intact allowing for a bundle to be found later without requiring a physical link to be created and managed within a navigational pane of an email service (i.e. as with folders/labels). If a bundle receives a new message or update that may be relevant to a user (e.g. meeting appointment, tracking of shipment, notification, etc.), the bundle would be prioritized in a mailbox of a user. Notably, once a bundle is created in an email service, subsequent email messages from bundled message threads may result in update to the created bundle, where a user would not have to go looking for individual messages/message threads.

Additionally, an exemplary bundle of content may inherit all (or some) of the triage actions and behaviors associated with a single message. That is, an email service is configured to enable a user to execute bulk actions with respect to a bundle of content (e.g. bundle of emails). For instance, a user can delete a bundle of emails without being required to go in and execute actions on specific emails.

Consider an example where a user is attempting to management content associated with a house renovation. A user can create a content bundle entitled "House Reno" and place emails relating to the renovation of their home into a bundle of emails. As an example, an exemplary tag of "House Reno" may be created and associated with all content that is part of the bundle. For instance, a user may receive emails from different contractors and want to associate all received emails in one grouping without having to continually go searching for each individual email. Notably, once a bundle is created in an email service, subsequent email messages from bundled message threads may result in update to the created bundle, where a user would not have to go looking for individual messages/message threads from different contractors.

Furthermore, an exemplary bundle is configured to manage associations with other application/services such as platform resources that may comprise a suite of different applications. For instance, a user may have a calendared appoint setup with a specific contractor. Notifications and alerts associated with such content may presented to the user in conjunction with a created bundle. When bundled content is shared, such notifications may also be provided to other users of the shared bundle. As an example, a schedule appointment (associated with a shared bundle) may also appear on a calendar of a shared user.

Continuing the above "House Reno" example, once the house renovation project is over and the user ceases receiving new mails that would go into this bundle, the bundle falls below the fold, out of sight and out of mind. However, if for any reason the user later needs to reference an email in this bundle, a search will return all emails pertaining to this bundle. If a new email associated with the bundle is received at a later point in time, the bundle may be prioritized for the user in a mailbox of the user. For instance, a contractor may be late sending a receipt (e.g. 6 months or a year later), where the email service is configured to prioritize the bundle of emails when that receipt is received. If the user's attention moves on to another project the constitutes a bundle, this bundle is now at the top of the inbox and the other older bundles fall off and do not clog the navigational control of the email service. A user would not be required to manually remove folders/labels from the UI of the email service after the fact. As one example, the ephemeral nature of an exemplary bundle is extremely beneficial to workers/groups that change projects every few months. Instead of having a massive list of hundreds of folders the represent the past projects, this user can have a clean and easy way to organize their content.

As referenced above, the bundle sharing component 108 utilizes exemplary tags for created bundles to identify content for sharing. Content (e.g. emails) in a bundle is tagged with the bundle name/ID (e.g. tag) as identified by an entity type tagging infrastructure. The exemplary tags may be created and/or shared at a transport delivery layer of the emails service to enable sharing of content with another user (or users). For example, a bundle may be associated with a bundle owner who adds an email from Expedia® to the "Cabo Vacation Planning" to a created bundle. The added email is then tagged, via the entity type tagging infrastructure, and an event based assistant is triggered that automatically delivers the email content to an inbox of another user who the bundle is shared with.

In order to ensure that the shared bundle participants can later get back to content they had previously classified to be part of a bundle, the emails within that bundle are stamped with a property (e.g. tag) that identifies these emails as pertaining to this topic or category. For example, all emails that the user adds to a shared "vacation" bundle are tagged using the hashtag "#vacation". If the user later searches for "vacation" this is translated to a search for all "#vacation" emails such that these emails appear higher in the relevance ranking than those that simply have the keyword "vacation." Because the user took the time to create this bundle and classify their content, the hashtag categorization results are prioritized, making them easier to find and get back to later in time.

For example, if a user is planning a vacation to Cabo with her spouse but often finds that vendors either send only one confirmation mail or drop off her spouse from the to line, she can create a bundle entitled "Cabo Vacation Planning" and share this with her spouse. In that example, a tag of "Cabo Vacation Planning" is associated with all content of the bundle and is shared with the spouse. In that example, the bundle sharing component 108 is configured to create a sharing permission that enables the spouse to see all past emails that were categorized to be part of this topic/category. In one example, the shared user (e.g. spouse) is automatically added as a blind carbon copy of all future emails that are added to the shared bundle. This may be a standard setting for a sharing permission unless the sharing permission is altered by a user. However, an exemplary sharing permission can be set to provide correspondence in any email field including a "to" field, and carbon copy field, among other examples. In further examples, sharing permissions can also be configured to enable shared users to manage email correspondence with respect to a shared bundle. For instance, the spouse can also add his email correspondence with the limo service he is booking to the shared bundle. This would ensure that his wife also receives the details. In that example, the wife would automatically receive an email (e.g. copy/blind carbon copy) on the email that was added to the bundle by the spouse. The wife would also receive, as part of the shared bundle, any correspondence received from the limo service (e.g. that is directed to the spouse). Either participant can also search for "Cabo Vacation Planning" and see all emails associated with a tagged bundle.

The bundle sharing component 108 is further configured to manage UI features of an email service that are associated with sharing of a created bundle (e.g. bundle of emails). User interface examples related to sharing of a bundle are illustrated in at least FIGS. 3A-3C. Sharing of an exemplary bundle can be initiated directly from a user mailbox of an email service. In one example, a bundle can be shared through context menus tied to access of a specific email message. For instance, a user may be reading a specific email of a bundle and elect to share the bundle with another user. In an alternative example, a UI of an email service is configured with a UI feature (e.g. through a command bar/application command control) that enables a user to quickly access a feature for sharing of a bundle of emails. In yet another alternative example, an exemplary email service is configured to enable a user to share a bundle of emails through device action (e.g. right click of mouse device, touch input, stylus input, etc.).

The bundle sharing component 108 is also configured to enable a user to set rules for a sharing permission pertaining to a specific user. In one example, a user that received a shared bundle may have the same access rights to the bundle as the user that shared the bundle. That is, the user can add/remove content, delete a bundle, create a new bundle from the shared bundle, share the bundle with other users, etc. A bundle owner (e.g. original user who shared the bundle) may desire to specify specific sharing permissions for other users. For example, a user may want to share content with another user but may not want to the user to add content to a bundle. The bundle sharing component 108 manages, through a UI of an email service, sharing permissions related to a created bundle. For example, sharing permission can be set on a per user basis, where a user can specify a sharing permission for another user relating to: how content is sent to another user, whether a user can share the bundle with other users and whether the shared bundle can be altered/edited by another user (e.g. content added or removed from the shared bundle, among other examples. In an alternative example, a bundle owner may share a copy of bundle with another user, where updates to the bundle (by the other user) do not affect the original bundle in an inbox of the bundle owner. In that example, the bundle owner may still receive updates to the shared bundle copy in their inbox.

Moreover, the bundle sharing component 108 is configured to provide notifications of updates to a shared bundle. Once a bundle has been shared, a user who is receiving the shared bundle may receive a notification (e.g. email notification) indicating that a bundle has been shared with them. In one such example, a user may need to accept the invite for the bundle to start appearing in their inbox. The bundle sharing component 108 may further be configured to provide the bundle owner with a notification of whether another user accepted/declined the sharing permission. In an alternative example, a shared bundle may appear in another users' inbox once it has been shared by a bundle owner. In any example, once a user is granted access to a shared bundle, the user can interact with the bundle just as if they had created it themselves. Users associated with a shared bundle may receive additional notifications for content changes and updates to a shared bundle. In one example, the bundle sharing component 108 provides the bundle owner with notification of any collaborative updates made to the bundle by other users.

The mailbox management component 110 is a component configured to manage email data associated with a user account of an email service and provide a representation of a mailbox (of the email service) that is associated with the user account of the user. The mailbox management component 110 may retrieve email data associated with the user account and generate a representation of a mailbox for the user. An exemplary representation of the mailbox may be provided through an email service (e.g. executing on a processing device such as processing device 102). Generation of a representation of a mailbox of a user is known to one skilled in the art. Moreover, the mailbox management component 110 may interface with the bundle sharing component 108 to enable the bundle sharing component 108 to access email data (associated with a user account) as well as email data associated with other user accounts for sharing of bundled content. Data associated with a created bundle of content (e.g. bundle of emails) may be shared between components of an email service including the bundle sharing component 108 and the mailbox management component 110. For instance, data associated with a created bundle of emails may be shared with the mailbox management component 110 to include a shared bundle of emails in a generated representation of a mailbox of the email service for one or more users with whom a bundle of content is shared with.

FIG. 2 is an exemplary method 200 related to sharing of bundled content with which aspects of the present disclosure may be practiced. As an example, method 200 may be executed by an exemplary processing device and/or system such as those shown in FIGS. 4-6. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. Processing operations described in method 200 may be implemented by one or more components connected over a distributed network, for example, as described in system 100 (of FIG. 1).

Method 200 begins at processing operation 202, where a first input is received through a user interface of the email service. The first input is associated with a selection of a user interface element of the email service for sharing of a bundle of emails. An exemplary bundle of emails may comprise a grouping of at least two separate email threads, among other features. Other examples of content associated with a bundle of emails is described in at least the foregoing description. Examples of UI features configured to initiate sharing of bundled content are provided in the foregoing description.

Flow may proceed to processing operation 204, where a second input is received through the user interface of the email service. The second input may be provided by the user, indicating one or more other users for sharing the bundle of emails. In some examples, processing of method 200 may proceed to processing operation 206, where a third input is received indicating sharing privileges related to the bundle of emails for the one or more other users. Examples related to specific privileges that may be set for user sharing are described in the description of the bundle sharing component 108 (of FIG. 1).

At processing operation 208, the bundle of emails is shared with the one or more other users. Sharing of the bundle of emails creates a sharing permission that enables multi-directional sharing between the user and the one or more other users for current content of the shared bundle of emails and future content added to the shared bundle of emails. In further examples, sharing (processing operation 208) of the bundle of emails further shares an exemplary tag (or tags) for the bundle of emails that enables the one or more other users to search for the shared bundle of emails within a users' own mailbox. Sharing (processing operation 208) of a bundle of emails may further comprise notification processing that alerts users of sharing permissions. For example, a notification of sharing may be transmitted, to the one or more other users, to notify the one or more other users that the bundle of emails is shared. In further examples, a user (who shared the bundle) may receive a notification that the one or more other users has accepted sharing of the bundle of emails.

Once a bundle of emails is shared, flow may proceed to processing operation 210, where the shared bundle of emails may be displayed in a mailbox of the user. As an example, display (processing operation 210) of the shared bundle of emails may present the shared bundle of emails inline with other emails of an email mailbox of the user. An example of an email mailbox of a user may be an inbox of the user.

Flow may proceed to decision operation 212, where it is determined whether there is an update to the shared bundle of emails. If no update occurs, flow of method 200 branches NO and remains idle until subsequent update occurs. In examples where no update occurs, a shared bundle of emails may be de-prioritized within a mailbox of the user, for example, as newer emails are received. In examples where an update occurs to a shared bundle of emails, flow of method 200 branches YES and proceeds to processing operation 214. An example of an update to shared bundle of emails is an update provided by a user. For instance, a user may add new content to or remove content from a shared bundle of emails. In another example, an update may be provided by one of the other users with whom the bundle of emails was shared with.

At processing operation 214, a shared bundle of emails is updated. Flow may proceed to processing operation 216, where any updates to the shared bundle of emails are automatically transmitted to sharing participants based on the established sharing permission. In one example, automatic transmission of an update to a shared participant is transmitted as one or more of: a carbon copy and a blind carbon copy.

Updates to the shared bundle of emails may be displayed (processing operation 218) within a mailbox of each of the shared participants of the bundle of emails. As an example, display (processing operation 218) of an update to the shared bundle of emails may be presented inline with other emails of an email mailbox of a user. Display (processing operation 218) of the update to the shared bundle of emails may prioritize the shared bundle of emails at the top of a mailbox of each of the shared participants.

Figure 3A:
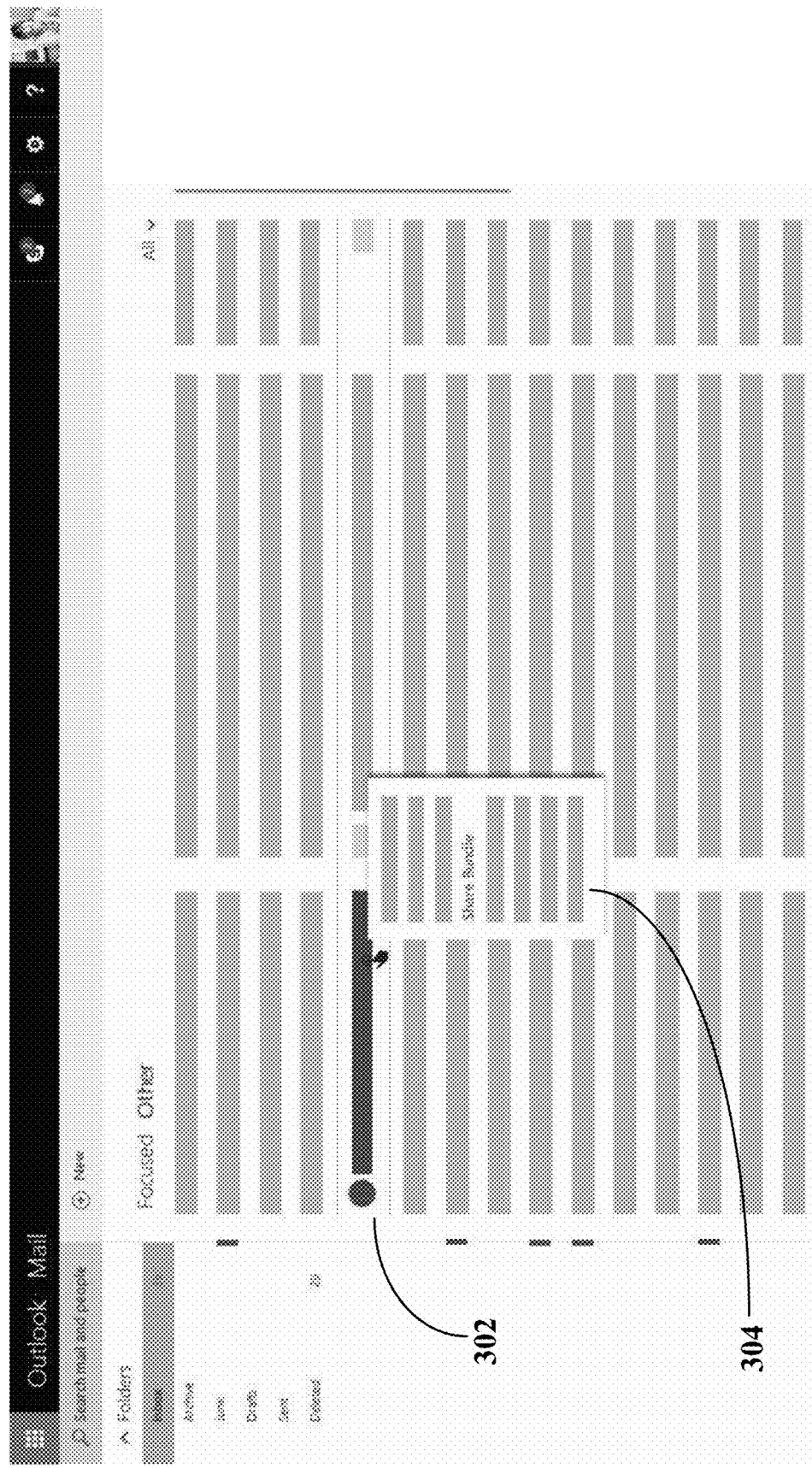
FIGS. 3A-3C provide user interface views illustrating user interface examples for managing bundling of emails in an email service, with which aspects of the present disclosure may be practiced.
Figure 3B:
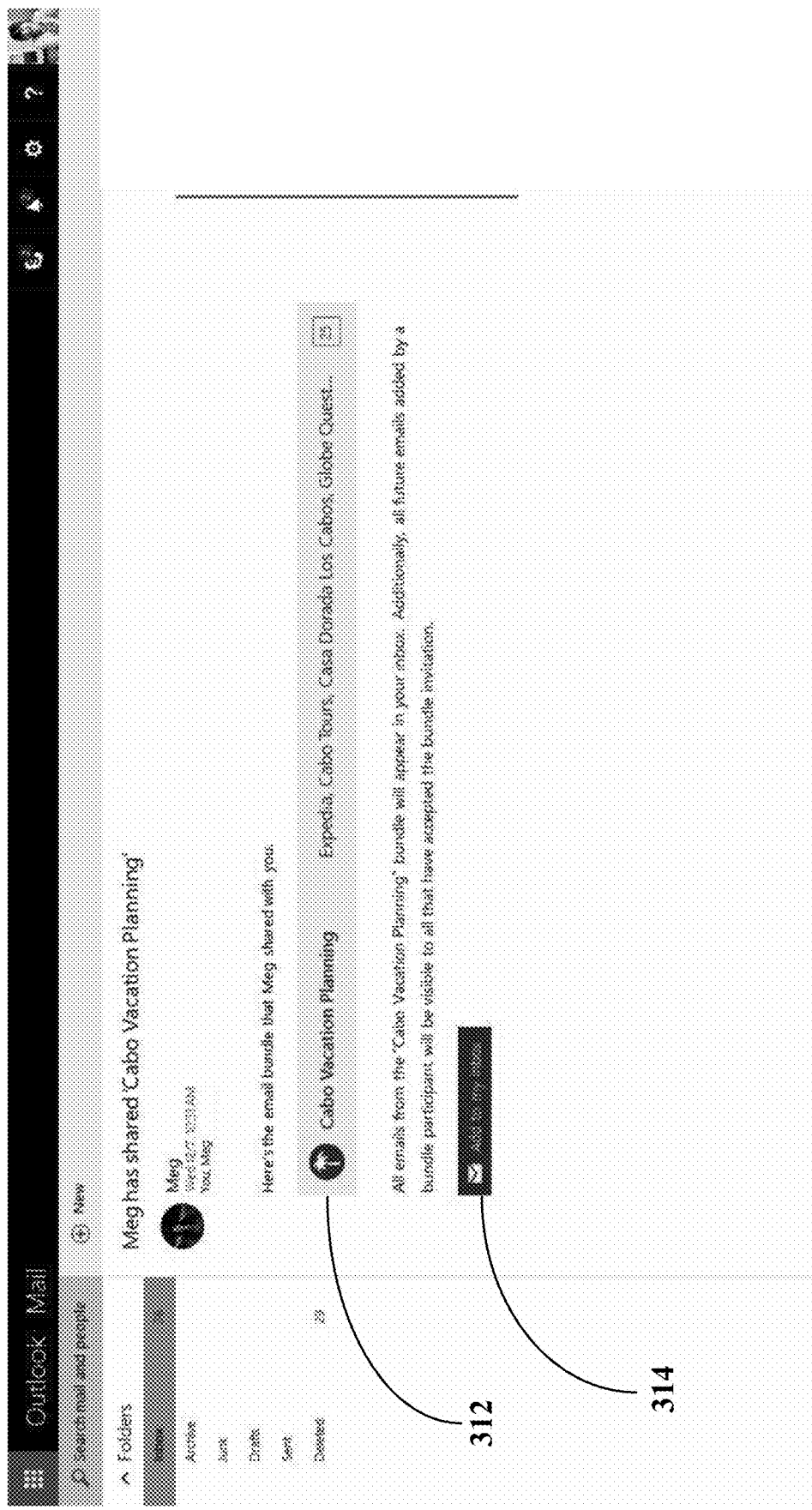
Figure 3C:
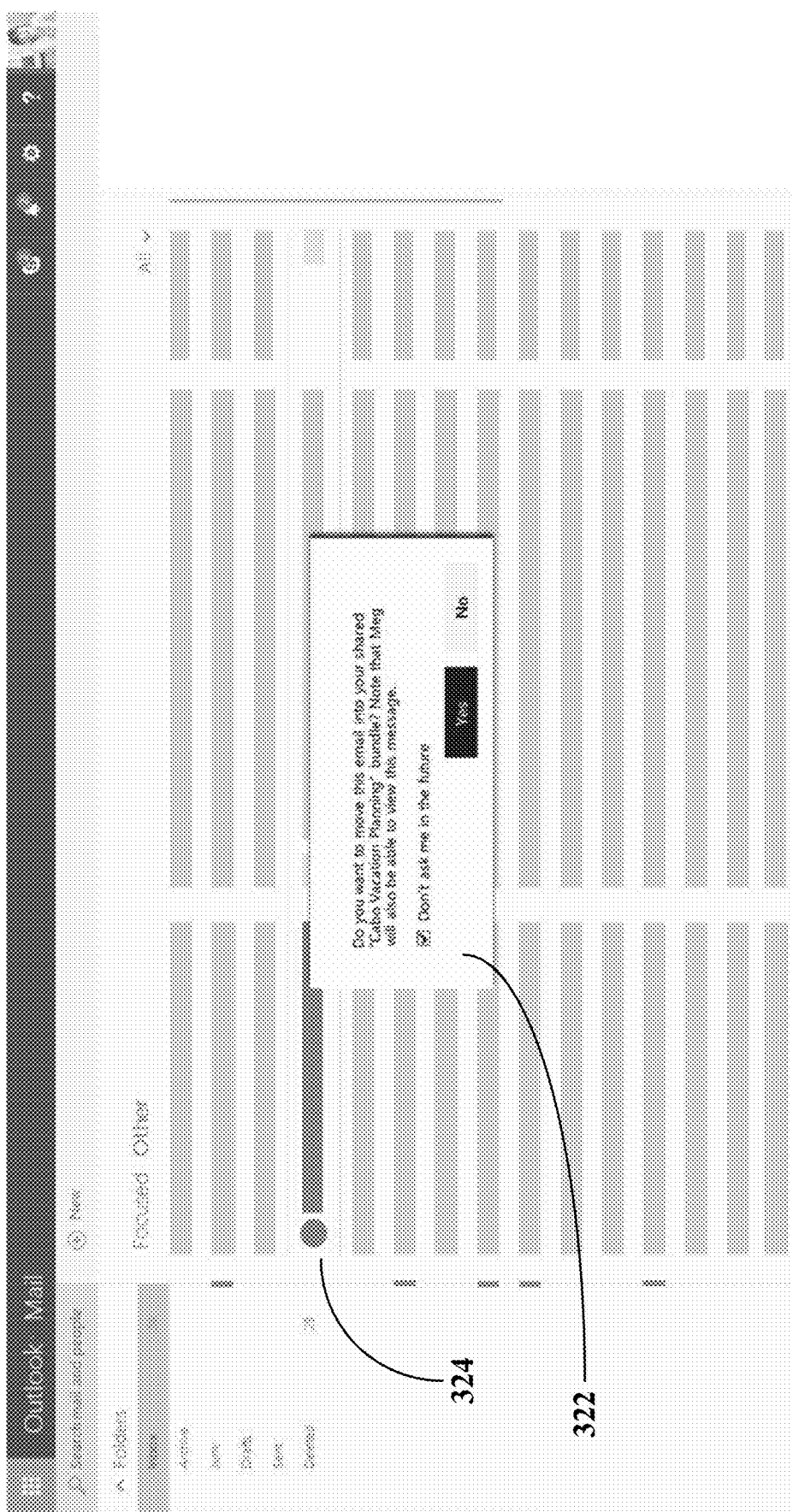

FIGS. 3A-3C provide user interface views illustrating user interface examples for managing bundling of emails in an email service, with which aspects of the present disclosure may be practiced. FIGS. 3A-3C provide visual examples related to sharing of an exemplary bundle by a user through a user interface of an email service. Sharing of an exemplary bundle by a user is described in at least the description of the bundle sharing component 108 of FIG. 1.

FIG. 3A illustrates user interface view 300, which provides a display of a user inbox of an exemplary email service. User interface view 300 illustrates an example where a created bundle may be shared. User interface view 300 illustrates one possible example of how an exemplary bundle may be shared. Other UI examples for triggering sharing of a bundle are described in the foregoing description including the description of the bundle sharing component 108 (FIG. 1). A user may select a bundle of emails 302, where a device action by the user may trigger display of a UI menu 304 that comprises a selectable option for sharing the bundle of emails. Alternative examples for UI menus (not shown) for sharing a bundle with different users as well as setting rules/privileges associated with a sharing permission are described in foregoing description.

FIGS. 3B illustrates user interface view 310, which provides a display of an email associated with a shared bundle. An exemplary email as shown in user interface view 310 may be received by a user whom the bundle was shared with by a bundle owner or other user associated with a bundle of emails. Among other information included in an exemplary email for a shared bundle, an exemplary email may comprise a UI link 312 to the shared bundle, where a user can directly access the shared bundle. An exemplary email may also comprise a UI feature 314 for a user to accept a sharing permission for a bundle. In an example, once the user selects to add a shared bundle to a mailbox (e.g. through selection of UI feature 314), email data associated with shared bundle may be forwarded to a mailbox of a user (e.g. inbox of a user account associated with an email service). The shared bundle may then appear in a mailbox of the shared user, where all future emails added by bundle participants are automatically provided to the shared user (as well as other shared users who the bundle is shared with).

FIGS. 3C illustrates user interface view 320, which provides a display of a user inbox of an exemplary email service. User interface view 320 provides a notification 322 for confirmation that a user wants to move email content 324 into a created bundle. For instance, a user may accidentally drag/drop an email on a bundle or select a UI feature for adding content to a bundle. In some examples, an exemplary UI of an email service may be configured to provide a notification such as notification 322 to confirm that a user intended to modify a created and/or shared bundle. An exemplary email service may be configured to enable a user to disable such functionality if a user prefers not to receive notifications each time an action is taken with respect to a created/shared bundle.

Figure 4:
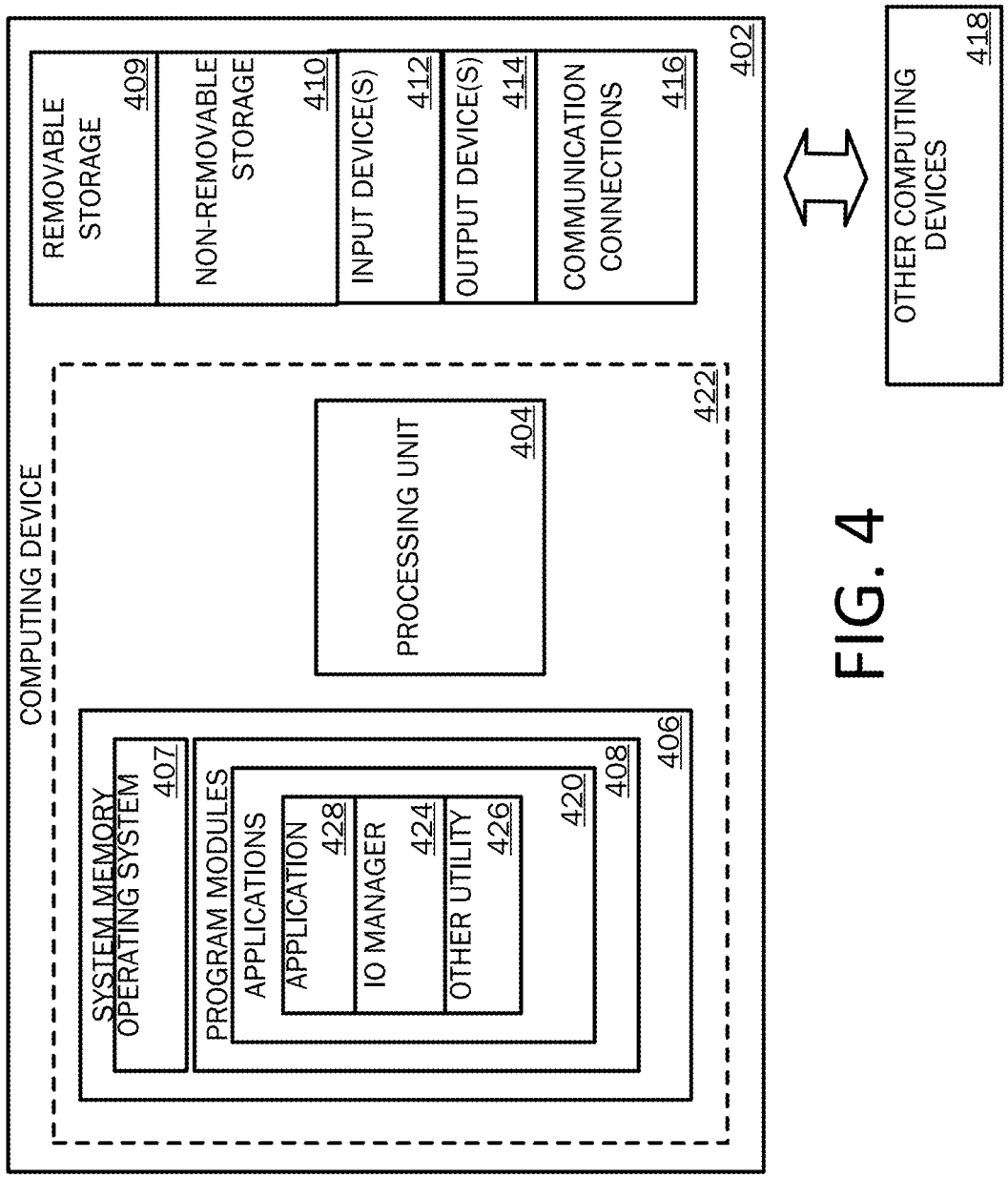
FIG. 4 is a block diagram illustrating an example of a computing device with which aspects of the present disclosure may be practiced.
Figure 5A:
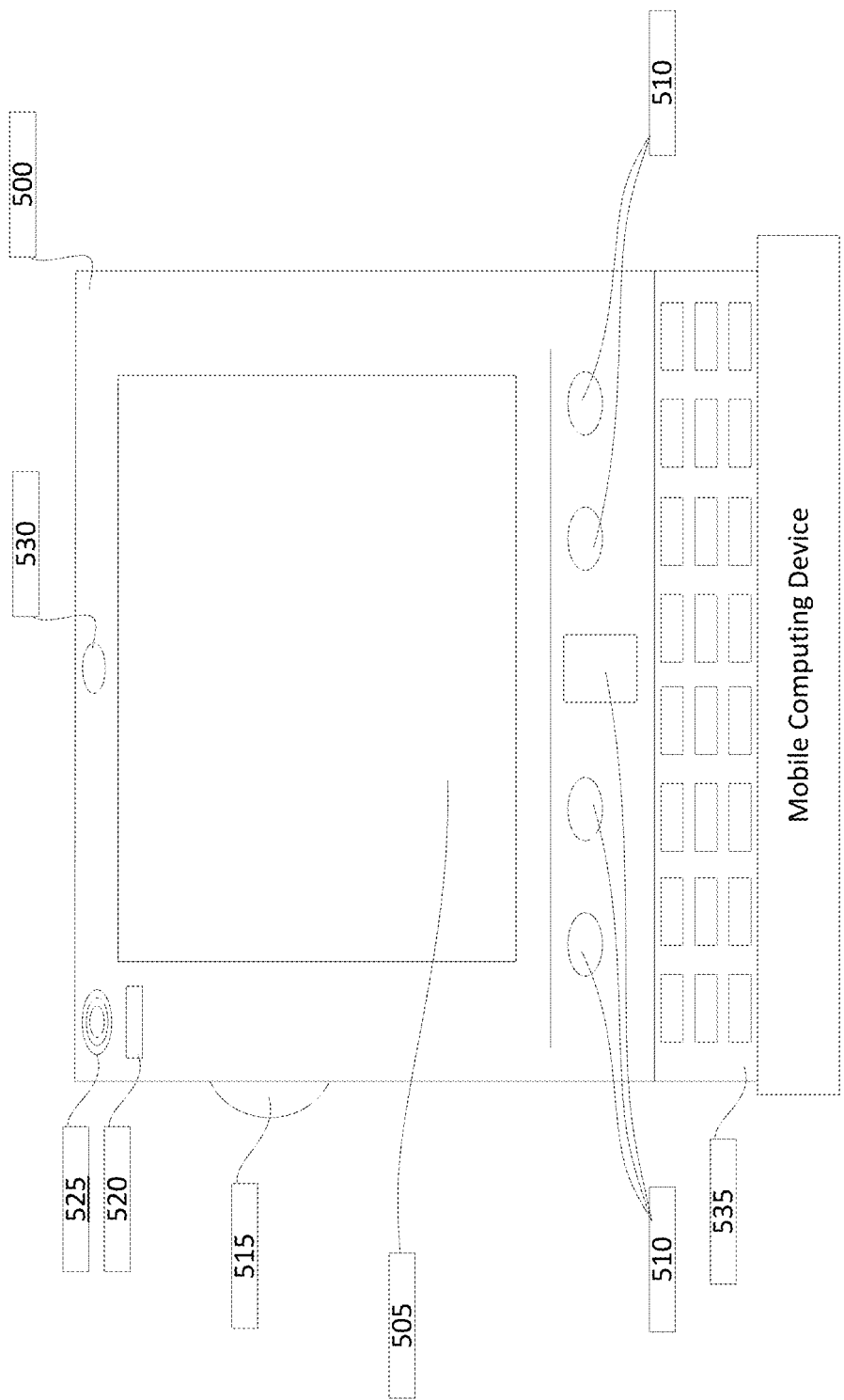
FIGS. 5A and 5B are simplified block diagrams of a mobile computing device with which aspects of the present disclosure may be practiced.
Figure 5B:
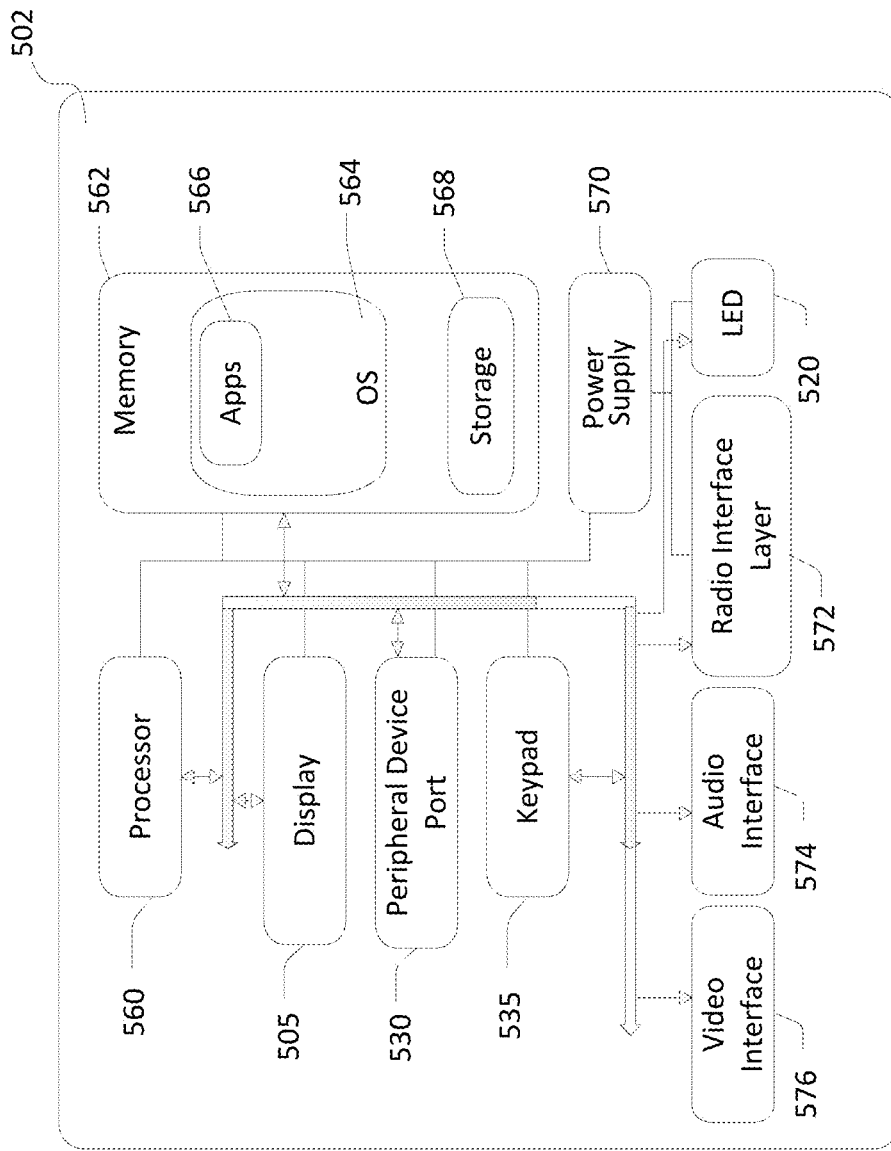
Figure 6:
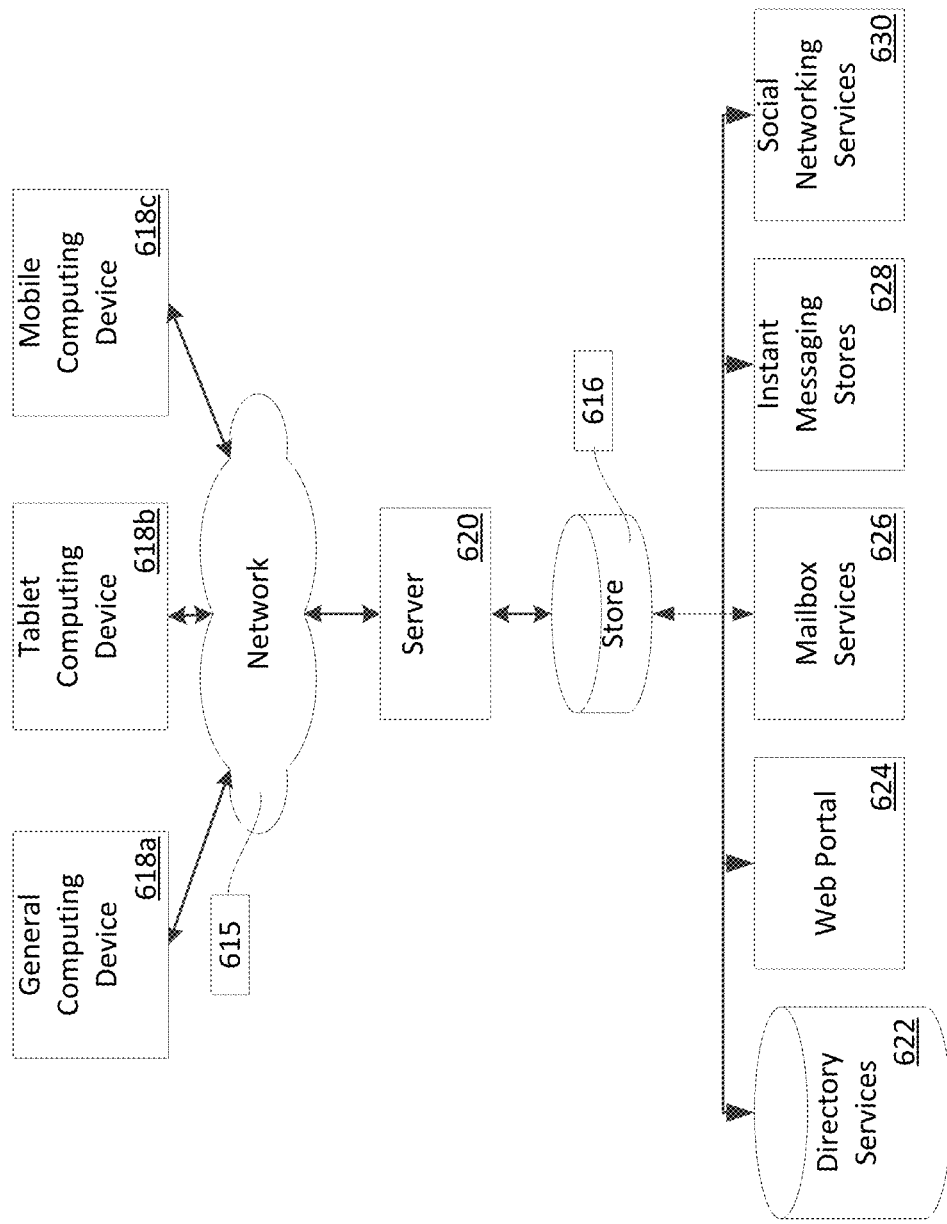
FIG. 6 is a simplified block diagram of a distributed computing system in which aspects of the present disclosure may be practiced.

FIGS. 4-6 and the associated descriptions provide a discussion of a variety of operating environments in which examples of the invention may be practiced. However, the devices and systems illustrated and discussed with respect to FIGS. 4-6 are for purposes of example and illustration and are not limiting of a vast number of computing device configurations that may be utilized for practicing examples of the invention, described herein.

FIG. 4 is a block diagram illustrating physical components of a computing device 402, for example a mobile processing device, with which examples of the present disclosure may be practiced. Among other examples, computing device 402 may be an exemplary computing device configured for execution of an email service as described herein. In a basic configuration, the computing device 402 may include at least one processing unit 404 and a system memory 406. Depending on the configuration and type of computing device, the system memory 406 may comprise, but is not limited to, volatile storage (e.g., random access memory), non-volatile storage (e.g., read-only memory), flash memory, or any combination of such memories. The system memory 406 may include an operating system 407 and one or more program modules 408 suitable for running software programs/modules 420 such as IO manager 424, other utility 426 and application 428. As examples, system memory 406 may store instructions for execution. Other examples of system memory 406 may store data associated with applications. The operating system 407, for example, may be suitable for controlling the operation of the computing device 402. Furthermore, examples of the invention may be practiced in conjunction with a graphics library, other operating systems, or any other application program and is not limited to any particular application or system. This basic configuration is illustrated in FIG. 4 by those components within a dashed line 422. The computing device 402 may have additional features or functionality. For example, the computing device 402 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 406. While executing on the processing unit 404, program modules 408 (e.g., Input/Output (I/O) manager 424, other utility 426 and application 428) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 402 may also have one or more input device(s) 412 such as a keyboard, a mouse, a pen, a sound input device, a device for voice input/recognition, a touch input device, etc. The output device(s) 414 such as a display, speakers, a printer, etc. may also be included. The aforementioned devices are examples and others may be used. The computing device 404 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 406, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 402. Any such computer storage media may be part of the computing device 402. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a personal data assistant, a tablet personal computer, a phablet, a slate, a laptop computer, and the like, with which examples of the invention may be practiced. Mobile computing device 500 may be an exemplary computing device configured for execution of an email service as described herein. Application command control may be provided for applications executing on a computing device such as mobile computing device 500. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 5A, one example of a mobile computing device 500 for implementing the examples is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In yet another alternative example, the mobile computing device 500 is a portable phone system, such as a cellular phone. The mobile computing device 500 may also include an optional keypad 535. Optional keypad 535 may be a physical keypad or a "soft" keypad generated on the touch screen display or any other soft input panel (SIP). In various examples, the output elements include the display 505 for showing a GUI, a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one examples, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA), tablet and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device (e.g. system 502) described herein.

The system 502 has a power supply 570, which may be implemented as one or more batteries. The power supply 570 might further include an external power source, such as an AC adapter or a powered docking cradle that supplements or recharges the batteries.

The system 502 may include peripheral device port 530 that performs the function of facilitating connectivity between system 502 and one or more peripheral devices. Transmissions to and from the peripheral device port 530 are conducted under control of the operating system (OS) 564. In other words, communications received by the peripheral device port 530 may be disseminated to the application programs 566 via the operating system 564, and vice versa.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525 (as described in the description of mobile computing device 500). In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525 (shown in FIG. 5A), the audio interface 574 may also be coupled to a microphone to receive audible input, such as to facilitate a telephone conversation. In accordance with examples of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing an application that reliably accesses target data on a storage system and handles communication failures to one or more client devices, as described above. The system of FIG. 6 may be an exemplary system configured for execution of an email service as described herein. Target data accessed, interacted with, or edited in association with programming modules 408 and/or applications 420 and storage/memory (described in FIG. 4) may be stored in different communication channels or other storage types. For example, various documents may be stored using a directory service 622, a web portal 624, a mailbox service 626, an instant messaging store 628, or a social networking site 630, application 428, IO manager 424, other utility 426, and storage systems may use any of these types of systems or the like for enabling data utilization, as described herein. A server 620 may provide storage system for use by a client operating on general computing device 402 and mobile device(s) 500 through network 615. By way of example, network 615 may comprise the Internet or any other type of local or wide area network, and a client node may be implemented for connecting to network 615. Examples of a client node comprise but are not limited to: a computing device 402 embodied in a personal computer, a tablet computing device, and/or by a mobile computing device 500 (e.g., mobile processing device). As an example, a client node may connect to the network 615 using a wireless network connection (e.g. WiFi connection, Bluetooth, etc.). However, examples described herein may also extend to connecting to network 615 via a hardwire connection. Any of these examples of the client computing device 402 or 500 may obtain content from the store 616.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, from a first user of an email service, a request to create a sharing permission for sharing of a bundle of emails with one or more other users, wherein the bundle of emails comprises a grouping of at least two separate email threads;
   in response to the received request, creating, by at least one computing device associated with the email service, the sharing permission that enables multi-directional sharing between the first user and the one or more other users for the bundle of emails, wherein the sharing permission is configured to automatically add an email address of the first user, that requested the sharing permission, to a recipient field of a subsequent email when the subsequent email is initiated for addition to the bundle of emails by the one or more other users;
   detecting that a second user, of the one or more other users, initiates an action to add the subsequent email, that is addressed to a third user, to the bundle of emails; and
   applying, by the at least one computing device, the sharing permission to the subsequent email based on the detecting the action to add the subsequent email to the bundle of emails, wherein the applying of the sharing permission automatically populates the recipient field of the subsequent email with the email address of the first user.

2. The method of claim 1, further comprising: sharing the bundle of emails with the one or more other users.

3. The method of claim 2, further comprising: transmitting, to the first user that requested the sharing permission, a notification that the one or more other users has been granted access to the bundle of emails.

4. The method of claim 1, wherein the applying of the sharing permission automatically adds the email address of the first user to a carbon copy field of the subsequent email created by the second user.

5. The method of claim 1, wherein the applying of the sharing permission automatically adds the email address of the first user to a blind carbon copy field of the subsequent email created by the second user.

6. The method of claim 1, wherein the creating of the sharing permission further comprises transmitting a sharing access request configured to enable the one or more other users to select whether to be granted access to the bundle of emails, and wherein the method further comprising: transmitting, to one or more of the first user and the one or more other users, a confirmation notification confirming that the one or more other users has been granted access to the bundle of emails based on acceptance of the sharing access request.

7. The method of claim 6, wherein the transmitting of the confirmation notification occurs prior to the detecting that the second user initiates the action to add the subsequent email to the bundle of emails.

8. A system comprising:
   at least one processor; and
   a memory operatively connected with the at least one processor storing computer-executable instructions that, when executed by the at least one processor, causes the at least one processor to execute a method that comprises:
     receiving, from a first user of an email service, a request to create a sharing permission for sharing of a bundle of emails with one or more other users, wherein the bundle of emails comprises a grouping of at least two separate email threads;
     in response to the received request, creating, by at least one computing device associated with the email service, the sharing permission that enables multi-directional sharing between the first user and the one or more other users for the bundle of emails, wherein the sharing permission is configured to automatically add an email address of the first user, that requested the sharing permission, to a recipient field of a subsequent email when the subsequent email is initiated for addition to the bundle of emails by the one or more other users;
     detecting that a second user, of the one or more other users, initiates an action to add the subsequent email, that is addressed to a third user, to the bundle of emails; and
     applying, by the at least one computing device, the sharing permission to the subsequent email based on the detecting the action to add the subsequent email to the bundle of emails, wherein the applying of the sharing permission automatically populates the recipient field of the subsequent email with the email address of the first user.

9. The system of claim 8, wherein the method, executed by the at least one processor, further comprises: sharing the bundle of emails with the one or more other users.

10. The system of claim 9, wherein the method, executed by the at least one processor, further comprises transmitting, to the first user that created the sharing permission, a notification that the one or more other users has been granted access to the bundle of emails.

11. The system of claim 8, wherein the applying of the sharing permission automatically adds the email address of the first user to a carbon copy field of the subsequent email created by the second user.

12. The system of claim 8, wherein the applying of the sharing permission automatically adds the email address of the first user to a blind carbon copy field of the subsequent email.

13. The system of claim 8, wherein the creating of the sharing permission further comprises transmitting a sharing access request configured to enable the one or more other users to select whether to be granted access to the bundle of emails, and wherein the method, executed by the at least one processor, further comprises: transmitting, to one or more of the first user and the one or more other users, a confirmation notification confirming that the one or more other users has been granted access to the bundle of emails based on acceptance of the sharing access request.

14. The system of claim 13, wherein the transmitting of the confirmation notification occurs prior to the detecting that the second user initiates the action to add the subsequent email to the bundle of emails.

15. A computer storage media storing computer-executable instructions that, when executed by at least one processor, causes the at least one processor to execute a method comprising:
   creating, by an email service, a sharing permission configured to enable multi-directional sharing of a bundle of emails between a first user and one or more other users, wherein the bundle of emails comprises a grouping of at least two separate email threads and the sharing permission automatically adds an email address of the first user, that initiated the sharing permission, to a recipient field of a subsequent email when the subsequent email is initiated for addition to the bundle of emails by the one or more other users;
   detecting that a second user, of the one or more other users, initiates an action to add the subsequent email, that is addressed to a third user, to the bundle of emails; and
   applying, by the at least one processor, the sharing permission to the subsequent email based on the detecting the action to add the subsequent email to the bundle of emails, wherein the applying of the sharing permission automatically populates the recipient field of the subsequent email with the email address of the first user.

16. The computer storage media of claim 15, wherein the method further comprising: transmitting, to the first user that created the sharing permission, a notification that the one or more other users has been granted access to the bundle of emails.

17. The computer storage media of claim 15, wherein the applying of the sharing permission automatically adds the email address of the first user to a carbon copy field of the subsequent email.

18. The computer storage media of claim 15, wherein the applying of the sharing permission automatically adds the email address of the first user to a blind carbon copy field of the subsequent email.

19. The computer storage media of claim 15, wherein the creating of the sharing permission further comprises transmitting a sharing access request configured to enable the one or more other users to select whether to be granted access to the bundle of emails, and wherein the method further comprising: transmitting, to one or more of the first user and the one or more other users, a confirmation notification confirming that the one or more other users has been granted access to the bundle of emails based on acceptance of the sharing access request.

20. The computer storage media of claim 19, wherein the transmitting of the confirmation notification occurs prior to the detecting that the second user initiates the action to add the subsequent email to the bundle of emails.

* * * * *